(12) United States Patent
Schuller et al.

(10) Patent No.: US 9,827,967 B2
(45) Date of Patent: Nov. 28, 2017

(54) GUIDE RING FOR A PUMP ELEMENT OF A VEHICLE BRAKE SYSTEM

(71) Applicant: Robert Bosch GmbH, Stuttgart (DE)

(72) Inventors: Wolfgang Schuller, Cleebronn (DE); Daniel Gosse, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 14/421,662

(22) PCT Filed: Jun. 19, 2013

(86) PCT No.: PCT/EP2013/062758
§ 371 (c)(1),
(2) Date: Feb. 13, 2015

(87) PCT Pub. No.: WO2014/026783
PCT Pub. Date: Feb. 20, 2014

(65) Prior Publication Data
US 2015/0217745 A1    Aug. 6, 2015

(30) Foreign Application Priority Data
Aug. 13, 2012 (DE) .................. 10 2012 214 355

(51) Int. Cl.
| F16J 1/10 | (2006.01) |
|---|---|
| B60T 17/02 | (2006.01) |
| F04B 53/02 | (2006.01) |
| B60T 8/40 | (2006.01) |
| F16J 9/12 | (2006.01) |
| B60T 11/236 | (2006.01) |

(52) U.S. Cl.
CPC ............ B60T 17/02 (2013.01); B60T 8/4031 (2013.01); B60T 11/236 (2013.01); F04B 53/02 (2013.01); F16J 9/12 (2013.01)

(58) Field of Classification Search
CPC ........ F16J 9/12; F16J 9/20; F04B 9/04; F04B 53/02; B60T 8/4031
USPC ............................................. 92/129
See application file for complete search history.

(56) References Cited

U.S. PATENT DOCUMENTS 8,011,907 B2 *  9/2011  Schepp ................. B60T 8/4031
                                                     92/135
2012/0042776 A1  2/2012  Gaertner et al.

FOREIGN PATENT DOCUMENTS

| CN | 102410208 A | 4/2012 |
|---|---|---|
| DE | 10 2006 036 442 A1 | 2/2008 |
| DE | 10 2007 048 242 A1 | 4/2009 |
| DE | 10 2010 040 135 A1 | 3/2012 |

OTHER PUBLICATIONS

International Search Report corresponding to PCT Application No. PCT/EP2013/062758, dated Jan. 30, 2014 (German and English language document) (5 pages).

* cited by examiner

*Primary Examiner* — Michael Leslie
(74) *Attorney, Agent, or Firm* — Maginot, Moore & Beck LLP

(57) ABSTRACT

A guide ring for a pump element of a hydraulic unit of a vehicle brake system is configured to guide a pump piston in a pump housing when the pump piston is displaced along the axis thereof in the pump housing. On the inner side of the guide ring facing the pump piston, the guide ring includes a first step that has a first inner diameter and a second inner diameter.

5 Claims, 3 Drawing Sheets

GUIDE RING FOR A PUMP ELEMENT OF A VEHICLE BRAKE SYSTEM

This application is a 35 U.S.C. §371 National Stage Application of PCT/EP2013/062758, filed on Jun. 19, 2013, which claims the benefit of priority to Serial No. DE 10 2012 214 355.6, filed on Aug. 13, 2012 in Germany, the disclosures of which are incorporated herein by reference in their entirety.

BACKGROUND

The disclosure relates to a guide ring for a pump element of a hydraulic unit of a vehicle brake system for guiding a pump piston in a pump housing when the pump piston is displaced along its axis in the pump housing. The disclosure further relates to the use of such a guide ring in a hydraulic unit module for vehicle brake systems.

Hydraulic units are used in vehicle brake systems in order to provide a controlled brake pressure in associated brake circuits. For controlling the brake pressure the hydraulic unit comprises, among other things, at least one pump element, the pump piston of which is displaceable in a pump cylinder. In the area where brake fluid is admitted into the pump cylinder the pump piston is further guided in a pump housing, in which an eccentric drive for the pump piston is also located. A sealing arrangement, which is formed by a sealing ring, a support ring and a guide ring, is generally provided between the eccentric drive and the admission area. The sealing ring produces a largely fluid-tight seal between the admission area, representing an area exposed to slight pressure, and the eccentric drive, representing an area largely free of pressure. The support ring supports the sealing ring. The guide ring serves to guide the pump piston relative to the pump housing and thereby also relative to the pump cylinder. This guidance occurs at that end area of the pump piston where lateral forces are introduced to the pump piston by the eccentric drive. These lateral forces are absorbed by the guide ring. Moreover, the guide ring defines the overall space for the sealing ring and the support ring in an axial direction, in such a way that a sealing effect is achieved with a degree of play necessary for the reciprocating movement of the piston. A sealing arrangement of this type is disclosed by DE10 2006 036 442 A1, for example.

Hydraulic units of different capacities are needed for different types of vehicles and different functions in a vehicle. These various capacity classes are achieved by means of different pump elements and in particular here by different pump piston diameters. For this purpose the pump housings must be matched to the different pump piston diameters, making it necessary to produce a plurality of different pump housing variants.

SUMMARY

According to the disclosure a guide ring is created for a pump element of a hydraulic unit of a vehicle brake system, for guiding a pump piston in a pump housing when the pump piston is displaced along its axis in the pump housing. The guide ring is designed with a first step having a first inside diameter and a second inside diameter on its inner side facing the pump piston.

Here the first inside diameter of the guide ring is slightly larger than the diameter of the pump piston and guides the pump piston with a requisite guide clearance in the guide ring. Together with the second inside diameter, which is larger than the first inside diameter, the disclosure creates a stepped internal contour of the guide ring. This stepped internal contour or step forms a free space or empty space in the form of a sleeve between the pump piston and this portion of the guide ring. At least one further component of the pump element, which is thereby confined and held both in an axial direction and in a radial direction, may be arranged in this sleeve.

A sealing ring, which with its radially outer side bears on the guide ring to form a seal, and with its radially inner side bears on the pump piston or piston to form a seal, is preferably accommodated as further component in the sleeve. It is especially preferred if in addition to the sealing ring a support ring, which is likewise confined radially outwards by the guide ring according to the disclosure, is accommodated in the step according to the disclosure in an axial direction between the sealing ring and the guide ring. A complete sealing arrangement is thereby advantageously also held radially in the guide ring according to the disclosure.

Here the guide ring holds the sealing ring in a bore of the pump housing, in which the pump element is arranged. With pump elements of different capacities and hence different pump piston diameters, the guide ring according to the disclosure means that this bore can always have the same diameter. For this purpose it is merely necessary to adapt the internal contour of different types of guide rings to the individual pump piston diameters and/or sealing ring diameters, their external contour remaining the same. According to the disclosure, therefore, the component variance of pump housings for different pump piston diameters is shifted to the guide rings. In production it is substantially more cost-effective to vary the shape of the different types of guide rings than to vary the pump housing. They are preferably manufactured simply by means of injection molding from brake fluid-resistant plastic.

In an advantageous development of the guide ring according to the disclosure this is designed with a second step having a third inside diameter on its inner side facing the pump piston. Here the third inside diameter is adapted to hold a further component compactly and stably in a radial direction. A filter, adjoining the sealing ring in an axial direction, for filtering fluid, especially brake fluid, in the admission area or low-pressure area of a pump inlet, preferably serves as the further component. This allows filters of different sizes to be easily and cost-effectively fitted by varying the third inside diameter, particularly where the external contour of the guide ring and hence the shape of the bore of the pump housing remain unchanged.

The guide ring is furthermore preferably designed with a third step having a first outside diameter and a second outside diameter on its outer side facing the pump housing. With the third step on its outer side the guide ring is held not only in a radial direction but also in an axial direction in the pump housing, particularly by means of a stepped configuration designed to complement the third step.

In addition, the guide ring is preferably designed with a tapered portion on its outer side facing the pump housing. Designed in this way, the guide ring according to the disclosure can be precisely positioned externally by just one step in the pump housing and internally still comprises multiple steps for the arrangement of the filter and the seal.

The disclosure is furthermore directed towards a use of such guide rings according to the disclosure in a hydraulic unit module for vehicle brake systems having one type of pump housing, at least two types of pump pistons and at least two types of guide rings. Here the one type of pump housing has only one internal contour facing the associated guide ring. At the same time at least the two types of pump pistons have different outside diameters. At least the two types of guide rings are adapted on the one hand for arrangement on the one internal contour of the one type of pump housing and on the other for arrangement on the different outside diameters of at least the two types of pump pistons.

Adapted in this way, at least the two types of guide rings have a different internal contour, which at least largely bears on the external contour of the associated type of pump piston with the respective outside diameter. Furthermore, at least the two types of guide rings have an identical external contour, which is adapted to the internal contour or bore of the one type of pump housing. One type of pump housing can therefore advantageously be used for different pump piston outside diameters and hence for piston pumps of different capacity classes. The number of pump housing variants needed is reduced compared to the conventional number, so that larger quantities of each variant can be produced. Considerably lower unit manufacturing costs are thereby achieved due to a lower handling cost and a reduced design and testing cost.

BRIEF DESCRIPTION OF THE DRAWINGS

Exemplary embodiments of the solution according to the disclosure are explained in more detail below with reference to the schematic drawings attached, of which.

DETAILED DESCRIPTION

Figure 1:
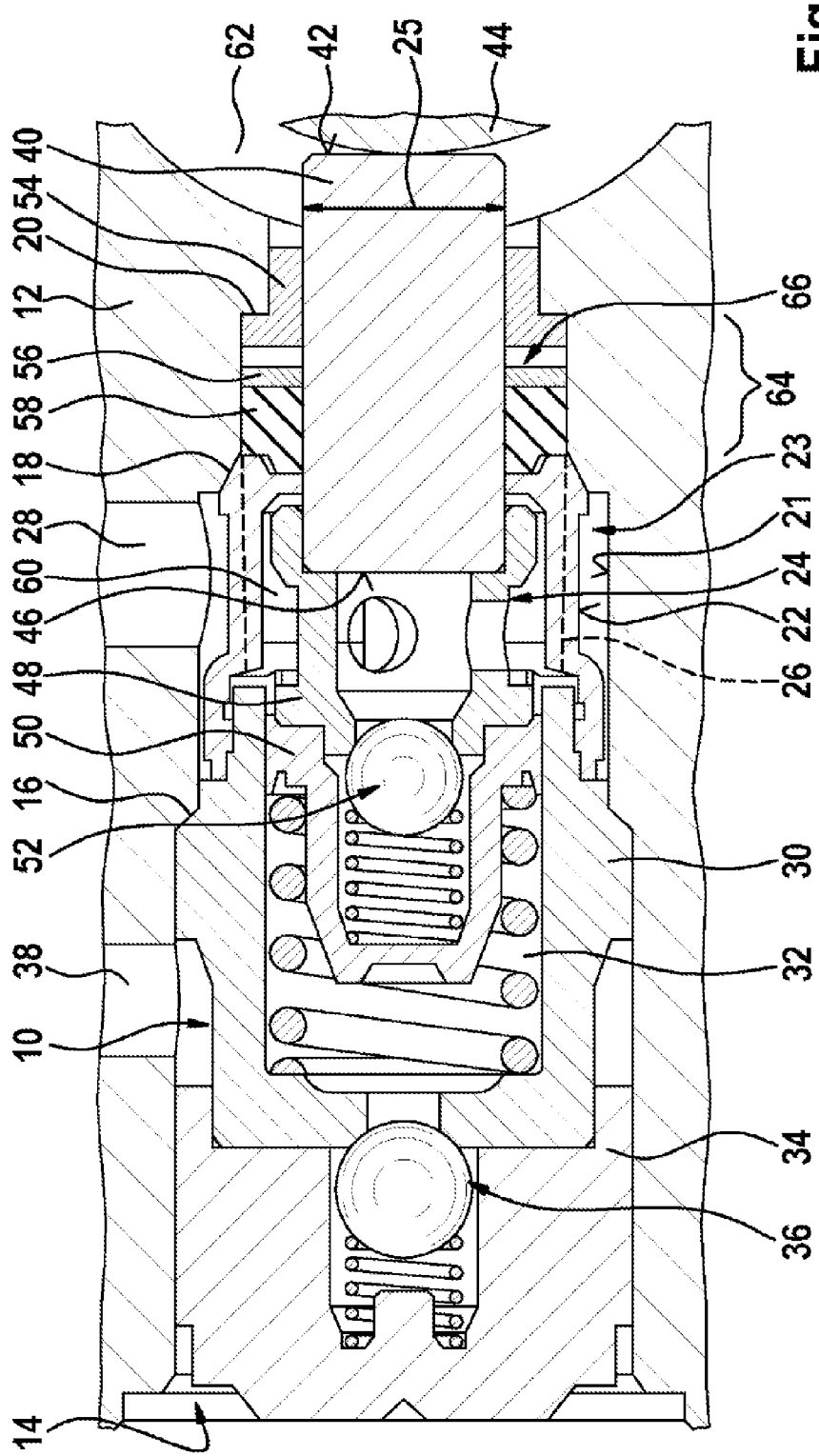
FIG. 1 shows a longitudinal section of an exemplary embodiment of a pump element having a guide ring according to the state of the art.

FIG. 1 illustrates a pump element 10 of a hydraulic unit, which is arranged in a block-shaped pump housing 12. The hydraulic unit allows an associated vehicle brake system, especially an antilock, a traction control and a driving dynamics control function (ABS, ASR and ESP) on vehicle brakes.

A stepped bore 14, in which the pump element 10 is arranged, is formed in the pump housing 12. The stepped bore 14 has three offsets 16, 18 and 20, which serve progressively to reduce the diameter of the bore 14 in steps from the outside inwards and to form an internal contour 21 of the pump housing 12. The pump element 10 has a substantially complementary external contour 22 to the internal contour 21. The pump element 10 further comprises a multipart pump cylinder 23, which with its outside diameter 25 encloses a likewise multipart pump piston 24.

The multipart pump cylinder 23 comprises an annular filter 26, to which brake fluid, through the inlet 28, can be fed radially inwards through the pump housing 12. Adjoining the filter 26 and facing axially outwards is a cylindrical cup 30, which encloses a delivery chamber 32. Situated then at the very outside is a cylinder cover 34, which is caulked so that it is fluid-tight to the pump housing 12 and which serves to retain the filter 26 and the cylindrical cup 30 and thereby the entire pump element 10 in the stepped bore 14. An outlet valve 36, which serves for the controlled discharge of brake fluid, under pressure, from the delivery chamber 32 into an outlet 38, is situated in the cylinder cover 34.

The multipart pump piston 24 is designed with a circular cylindrical piston tappet 40, which is situated in the axially innermost area of the bore 14. With its outside diameter the piston tappet 40 forms the outside diameter 25 of the pump piston 24 relevant here. Furthermore, at one end face 42 the piston tappet 40 can be moved in an axial direction out of the bore 14 by an eccentric 44. Abutting the other end face 46 of the piston tappet 40 is a piston sleeve 48, through which the brake fluid, admitted through the inlet 28 and the filter 26, can flow further radially inwards. A piston gasket 50 then axially abuts the piston sleeve 48, an inlet valve 52 being situated between the piston sleeve 48 and the piston gasket 50 for feeding the admitted brake fluid into the delivery chamber 32.

As part of the pump piston 24 the piston tappet 40 is guided in the inner part of the stepped bore 14 by means of a guide ring 54, a support ring 56 and a sealing ring 58. The sealing ring 58 is embodied as a low-pressure sealing ring and seals off a low-pressure area 60 prevailing at the filter 26 from an entirely pressureless eccentric area 62 prevailing at the eccentric 44. The support ring 56 supports the sealing ring 58 and protects the latter against mechanical damage. The guide ring 54 absorbs and buffers lateral forces occurring during the operation of the eccentric 44. At the same time the guide ring 54 serves as bearing surface for the piston tappet 40, allows a reciprocal sliding movement of the piston tappet 40 free from fiction in the pump housing 12 and thereby prevents abrasive wear.

According to FIG. 1 the conventional guide ring 54 is arranged between the third offset 20 of the bore 14 and the support ring 56 in a purely cylindrical area 64 of the bore 14. The sealing ring 58 is also positioned in the purely cylindrical area 64 adjoining the support ring 56 in an axial direction. The guide ring 54 thereby confines and holds the sealing ring 58 and the support ring 56 in a first axial direction. In the opposite direction to the first axial direction the sealing ring 58 and hence also the support ring 56 are confined by means of the filter 26, which bears with its inner end face on the second offset 18 of the stepped bore 14 and is supported against the latter. Supported in this way, the pump element 10 is also fixed in the stepped bore 14.

The guide ring 54 together with the sealing ring 58 and the support ring 56 forms a sealing arrangement 66.

Figure 2:
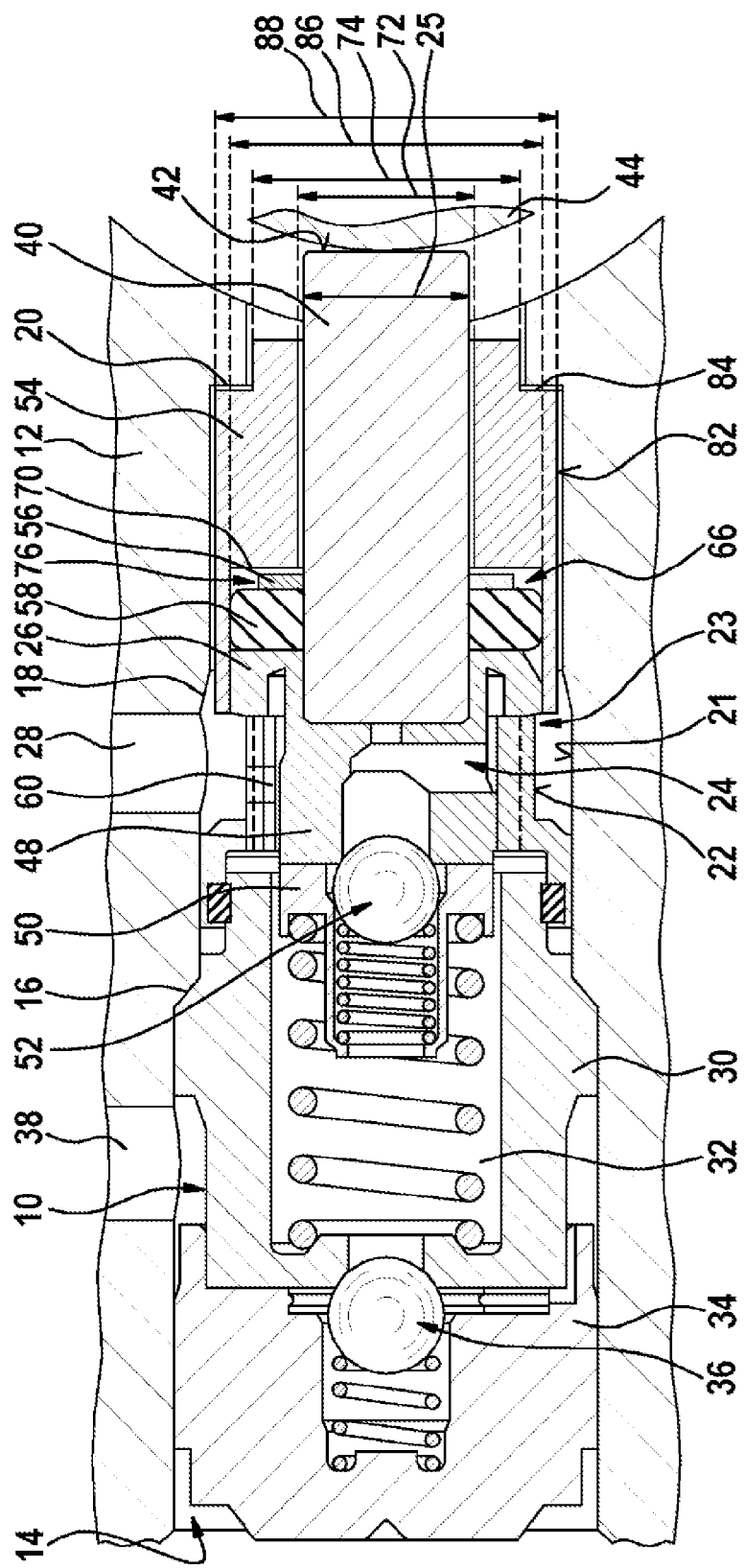
FIG. 2 shows a longitudinal section of an exemplary embodiment of a pump element having a first variant of a guide ring according to the disclosure and FIG. 3 shows an enlarged longitudinal section of a second variant of a guide ring according to the disclosure.
Figure 3:
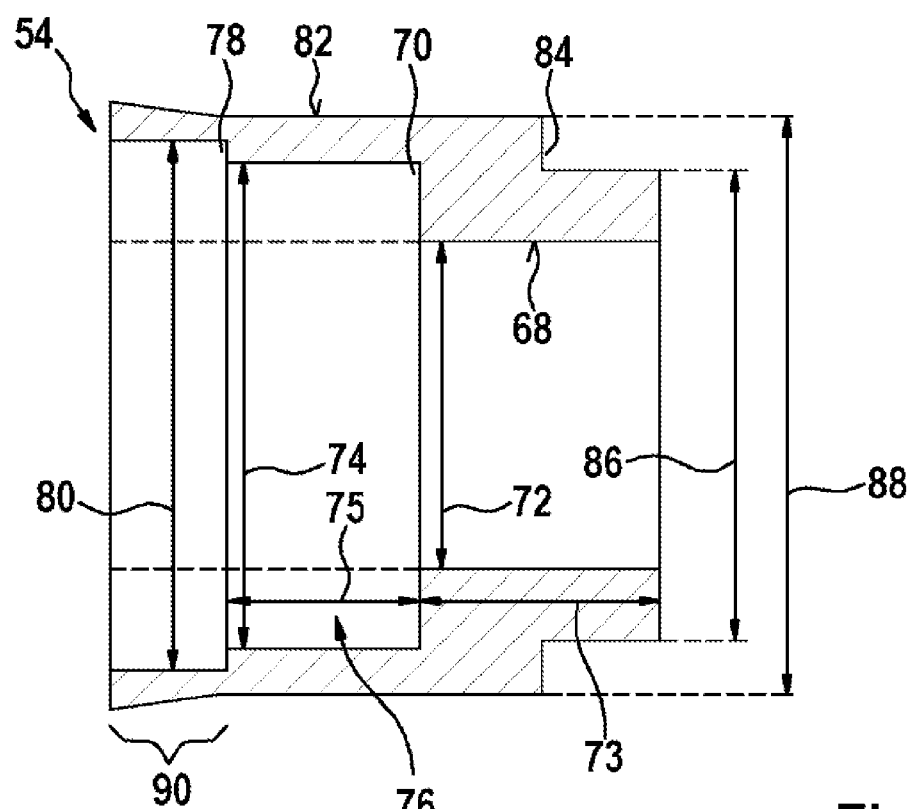

FIG. 2 and FIG. 3 illustrate a guide ring 54 according to the disclosure. With its inner side 68 the guide ring 54 according to the disclosure faces the piston tappet 40 of the multipart piston pump 24. In a first variant of the guide ring 54 the inner side 68 comprises a first step 70 having a first inside diameter 72 and a second inside diameter 74 (FIG. 2). Here the first inside diameter 72 is slightly larger than the diameter of the piston tappet 40 and extends over a first length 73. There the guide ring 54, with its inner side 68, forms a sliding surface for the reciprocating sliding movement of the piston tappet 40 during operation. The second inside diameter 74 is larger than the first inside diameter 72, so that with the first step 70 a hollow cylindrical portion 76 or a sleeve is formed over a second length 75. The support ring 56 and the sealing ring 58 are accommodated there and according to the disclosure are confined and held not only axially but also radially outwards by the guide ring 54. Overall, this creates an especially compact and stable sealing arrangement 66.

In a second variant of the guide ring 54 according to FIG. 3 a second step 78 having a third inside diameter 80, which is larger than the second inside diameter 74, is formed on its inner side 68. Formed in this way, it is possible to accommodate a further component, which has a larger diameter than the sealing ring 58. The further component is advantageously the filter 26 of corresponding size.

On its outer side 82 the guide ring 54 comprises a third step 84 having a first outside diameter 86 and a larger, second outside diameter 88. This third step 84 advantageously serves to hold the guide ring 54 against the third offset 20 of the bore 14 of the pump housing 12.

In the second variant according to FIG. 3 the outer side 82 further comprises a tapered portion 90, which is designed to complement the second offset 18 of the bore 14.

The crucial aspect of the solution according to the disclosure is that the guide ring 54 with its outer side 82 always has the same external contour irrespective of the size of the piston tappet 40 or of the sealing ring 58 and/or the support ring 56. One type of pump housing 12 can then be used for different types of pump elements 10 having pump pistons 24 of different sizes and hence different capacity classes, affording exceptional savings in both time and costs. It is merely necessary to adapt the internal contour of the guide ring 54 to the pump piston 24.

The invention claimed is:

1. A guide ring for a pump element of a hydraulic unit of a vehicle brake system, the guide ring configured to guide a pump piston in a pump housing when the pump piston is displaced along its axis in the pump housing, the guide ring comprising:
   a first step having a first inside diameter and a second inside diameter on its inner side facing the pump piston,
   wherein the guide ring is configured with a tapered portion on an outer side of the guide ring, and
   wherein the second inside diameter is between the first inside diameter and the tapered portion.

2. The guide ring as claimed in claim 1, wherein the guide ring is configured with a second step having a third inside diameter on its inner side facing the pump piston.

3. The guide ring as claimed in claim 1, wherein the guide ring is configured with a third step having a first outside diameter and a second outside diameter on its outer side facing the pump housing.

4. The guide ring as claimed in claim 1, wherein the tapered portion faces the pump housing and is tapered away from the first step.

5. A kit for a hydraulic unit module for a vehicle brake systems, the hydraulic unit module including a pump housing and at least two pump pistons, the pump housing having an internal contour and the at least two pump pistons each having different outside diameters, the kit comprising:
   a first guide ring and a second guide ring, the first guide ring including a first step having a first inside diameter and a second inside diameter on its inner side facing the pump pistons, the second guide ring including a second step having a third inside diameter and a fourth inside diameter on its inner side facing the pump pistons,
   wherein the first guide ring and the second guide ring are configured for arrangement on (i) the internal contour of the pump housing and (ii) the different outside diameters of the at least two pump pistons.

* * * * *